March 12, 1963　　　I. L. ENSLEY ET AL　　　3,080,958
VENEER SHEET HANDLING AND LOADING APPARATUS
Filed May 12, 1958　　　　　　　　　　　　　4 Sheets-Sheet 2

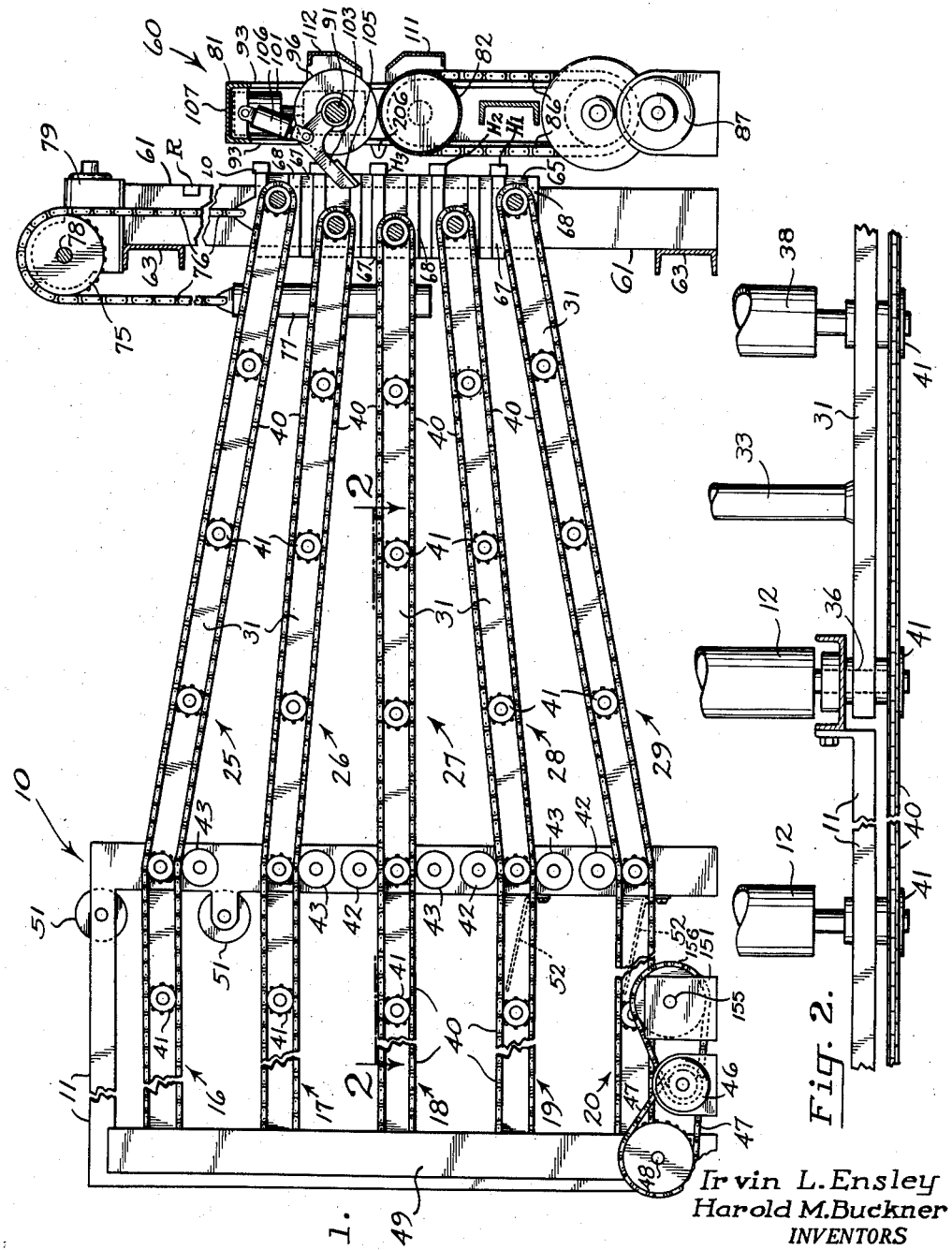

Irvin L. Ensley
Harold M. Buckner
INVENTORS

BY Ramsey and Kolisch
Attys.

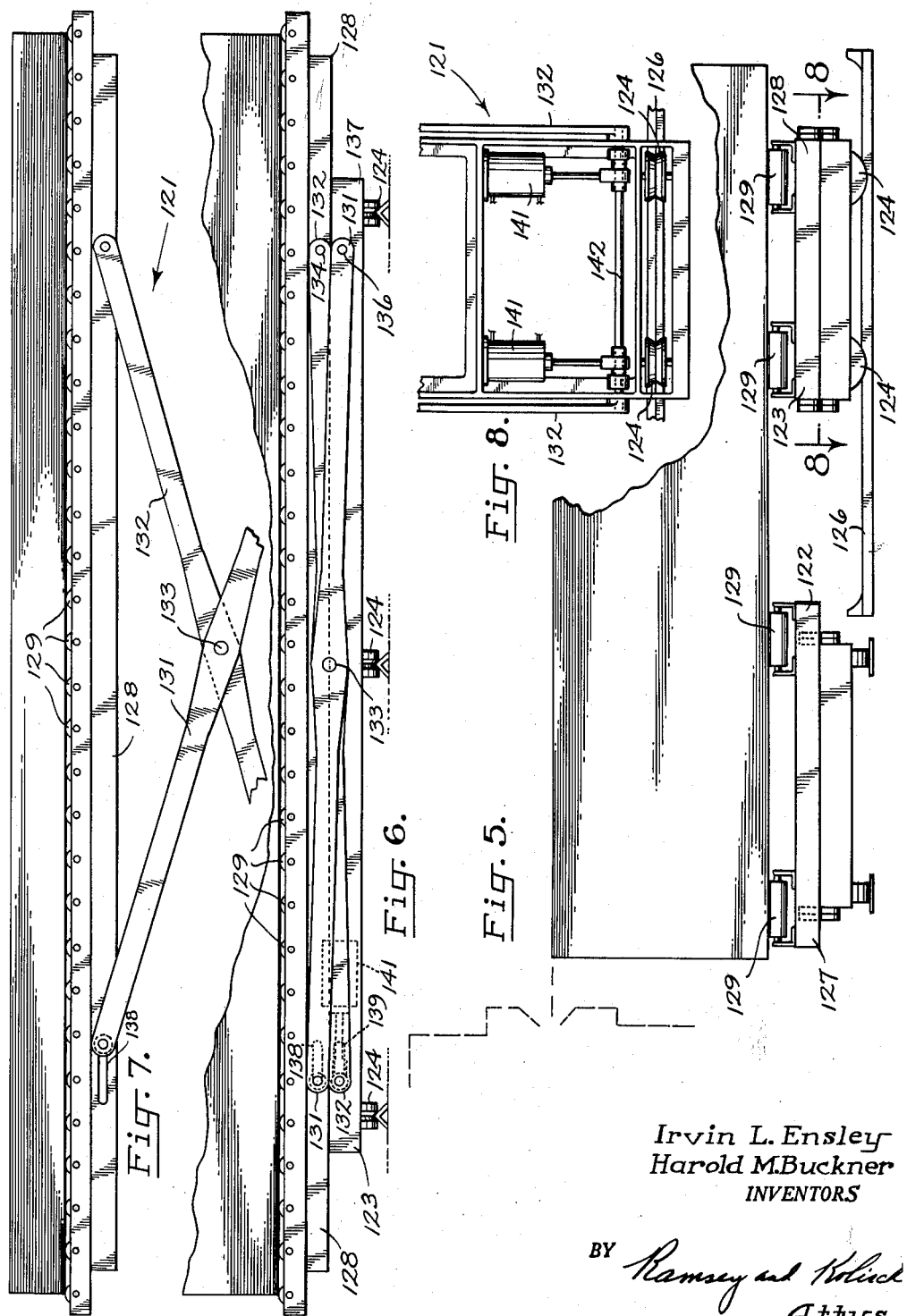

Irvin L. Ensley
Harold M. Buckner
INVENTORS

United States Patent Office 3,080,958
Patented Mar. 12, 1963

3,080,958
VENEER SHEET HANDLING AND LOADING APPARATUS
Irvin L. Ensley and Harold M. Buckner, Drain, Oreg., assignors, by mesne assignments, to E. V. Prentice Company, Portland, Oreg., a partnership
Filed May 12, 1958, Ser. No. 734,664
9 Claims. (Cl. 198—105)

This invention relates to veneer sheet handling apparatus, and more particularly to novel feeding or loading mechanism for loading sheets one after another in close abutting relation to the stacked conveyor sections or decks of a multideck receiving conveyor assembly. The mechanism is characterized by relative simplicity, substantially reduced space requirements, and fast and positive action which makes possible efficient operation over extended periods with a minimum amount of breakdown time.

In handling veneer sheets, as when loading them onto a multideck receiving conveyor to transport them through a drier, maximum use of the drier is realized if each deck of the conveyor is fully loaded. The mechanism loading the drier should have a minimum amount of moving parts, to reduce chances of breakdown and the necessity for plural motors to move the parts. It should also be realized that driers are conventionally relatively long, and it is desirable to save as much space as possible by making any feed mechanism for the drier as short as possible. Generally it is an object of this invention to take care of the hereinabove described requirements in a highly practical and satisfactory manner.

More specifically, an object and feature of this invention is the provision of loading or feeding mechanism for a multideck receiving conveyor assembly which employs a plurality of conveyor extensions or aprons corresponding in number to the sections of the receiving conveyor, and each connecting with one deck of the receiving conveyor. These aprons or extensions transport veneer to the conveyor decks and are driven at the same speed as the conveyor decks. The outfeed ends of the extensions are pivoted where they connect with their respective conveyor decks, the nonpivoted or free ends of the conveyor extensions being movable up and down in a vertical path.

The invention also features at the infeed ends of the conveyor extensions a stationary feed station having opposed feed rolls which feed sheets from a feed point of fixed elevation toward the infeed ends of the conveyor extensions. The infeed or nonpivoted ends of the conveyor extensions are moved up and down with successive extensions moving into registry with the feed point of the feed station, and when a registering position is obtained, the veneer required to load completely the particular extension is fed into the extension. Thus, the feed rolls, which are running at a relatively high speed, are not moving to seek alignment, but instead the more slowly driven receiving aprons or extensions collecting the veneer are moved into alignment.

To compensate for the diminution in height occurring to a stack of veneer as it is fed into the feed station, an elevatable support means is provided at the infeed or rearward side of the feed station. This elevatable support means is in practice actuated only periodically and at relatively infrequent intervals, when it is necessary to raise a stack to compensate for the removal of top layers of veneer therefrom.

This invention also contemplates novel control mechanism regulating up and down movement of the infeed or nonpivoted ends of the conveyor extensions, as well as clamping movement of the feed rolls provided in the feed station. A fence or cut-off bar is provided which prevents transport of veneer through the feed station during the intervals that the conveyor extensions are out of registry therewith. This fence or bar also acts as an indexing means during those intervals, serving as a means for aligning the forward ends of sheets to be charged onto the extension next moving into a registering position.

Control of the transport of sheets through the feed station is accomplished entirely by means of a signal or impulse generated at periodic intervals determined by the transport speed of the conveyor sections of the receiving conveyor assembly. Such a control is readily adjusted to compensate for variations in veneer lengths. In this respect, the control is considerably more flexible than those heretofore proposed.

A further object and feature of the invention is the provision of novel mounting mechanism spacing the nonpivoted or infeed ends of the extensions from one another. The mounting includes a sliding or shifting support for each extension, so that vertical linear movement of the mounting produces pivotal movement of the extensions whereby they may be successively pivoted into registry with the feed point of the feed station.

Other objects, features and advantages will become apparent as the following description is read in conjunction with the accompanying drawings wherein:

FIG. 1 is a side view with portions broken away of apparatus according to this invention, showing portions of a multideck receiving conveyor, aprons connected to the decks of the latter, and a feed station as contemplated by this invention on the infeed side of the aprons;

FIG. 2 is a section view along the line 2—2 in FIG. 1;

FIG. 5 is a side elevation of elevatable platform structure on the infeed or rear side of the feed station;

FIG. 6 is a rear elevation of the platform structure of FIG. 5;

FIG. 7 is a view similar to FIG. 6, showing a portion of the platform structure as it appears when elevating a stack of veneer;

FIG. 8 is a section view along the line 8—8 in FIG. 5; and

Figure 3:
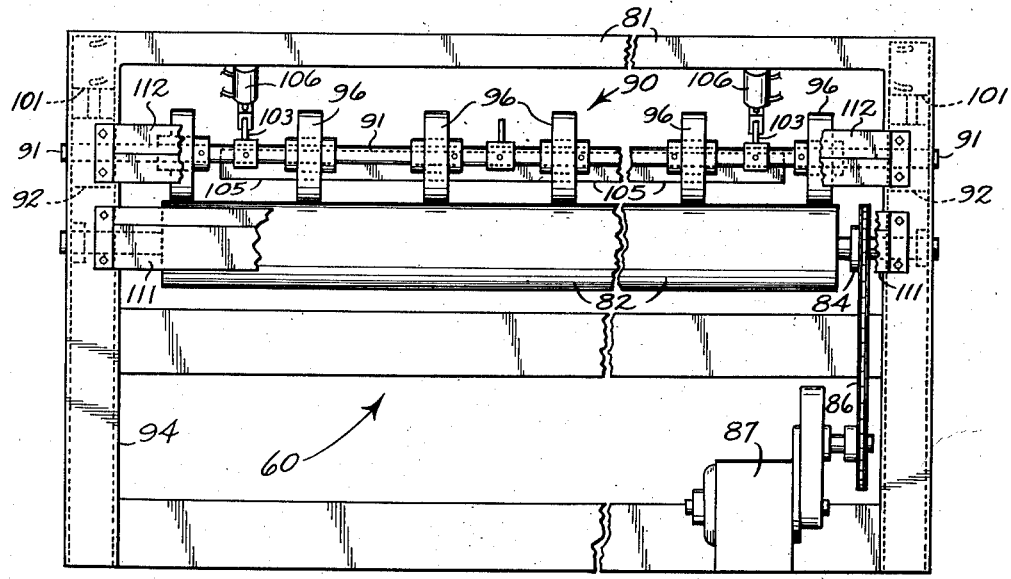
FIG. 3 is an elevation viewing the infeed side of the feed station.

Referring now to the drawings wherein a specific embodiment of the invention is disclosed, and in particular to FIGS. 1 and 2, 10 indicates generally a receiving conveyor assembly comprising a frame 11 formed of interlaced support members mounting a series of smooth surfaced, steel rolls 12 arranged in parallel rows, with one row stacked over another. Each row of rolls 12 defines a conveyor deck or section of the conveyor assembly. In the embodiment illustrated, the conveyor assembly has five decks, indicated at 16, 17, 18, 19, and 20, respectively. The number of decks will vary depending on the operation. In the ordinary instance, opposite ends of the receiving conveyor assembly are spaced a relatively long distance apart, the conveyor decks traveling intermediate their ends through a drier (not illustrated). Intermediate portions of the conveyor assembly have not been shown, as details of the drier form no part of this invention.

Figure 4:
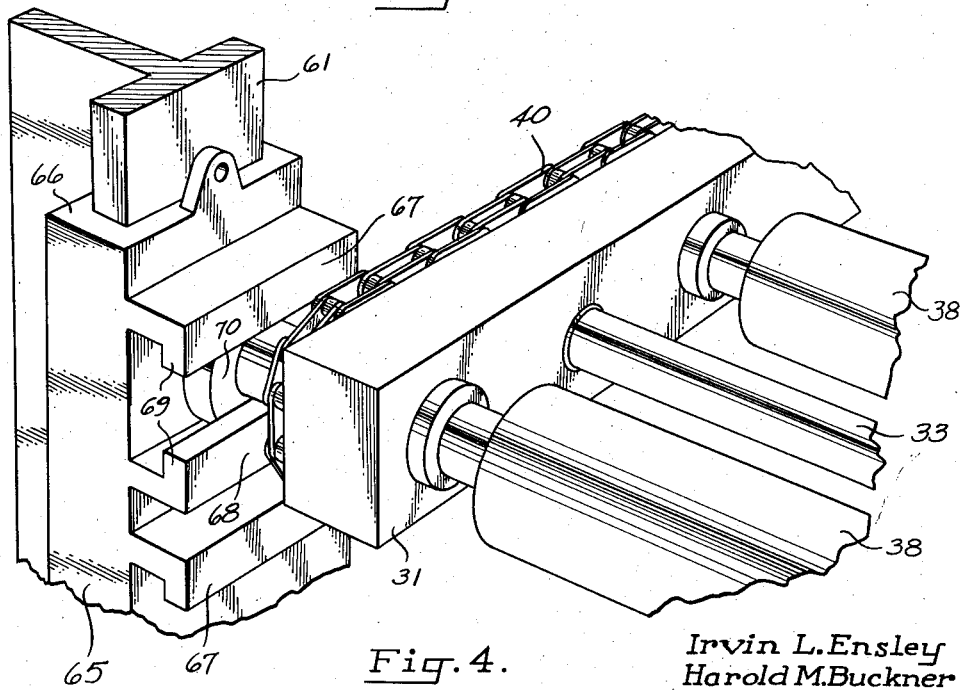
FIG. 4 is a perspective view, slightly enlarged, showing a mounting used for the aprons or extensions.

At the infeed or rearward end of receiving conveyor 10 there are provided a series of conveyor extensions or aprons 25, 26, 27, 28, and 29. With reference to FIGS. 1, 2, and 4, each comprises opposed side frame members 31 spaced apart and braced as by spreader members or rods 33 extending between the side frame members. The side frame members are pivoted by pivots 36 to opposed upstanding frame members of the receiving conveyor frame located at the infeed end thereof. Each of the conveyor extensions also comprises a series of steel rolls 38, similar to rolls 12 of the conveyor decks, rotatably mounted in the side frame members of the extension. Each of the extensions connects at its pivoted end with the infeed end of one of the decks of the receiving conveyor.

The receiving conveyor decks, and the conveyor extension for each deck, are all driven in unison and at a predetermined speed. The decks and extensions are driven by a series of drive chains 40, one for each deck and its associated extension. These chains are reeved over sprockets 41 nonrotatably fixed to a shaft extension provided each roll. Where the extension of a conveyor deck joins with the conveyor deck, hold-down pulleys 42 and 43 are also provided to prevent any slackness in a chain which would permit it to move out of engagement with its supporting sprocket. A motor 46 and chain 47 drive an input shaft 48 of a conventional gear box 49, the gear box having suitable sprockets engaging and driving chains 40.

The infeed or nonpivoted ends of the conveyor extensions are movable up and down in a path, as their other ends pivot about pivots 36. These infeed ends are moved up and down in unison, with successive ends passing registering positions with a feed station to be described.

Rolls 51 and deflector plates 52 may be provided where necessary above and below the infeed ends of the conveyor decks where an extension joins with each deck, to guide veneer onto a deck as it passes over the joint between the two. The rolls are shown rotatably mounted on frame 11 of the conveyor assembly, and the plates are affixed to frame 11 in any suitable manner.

Rearwardly, or on the infeed side of the conveyor extensions, is a feeding station generally indicated at 60. The extensions are interposed between the receiving conveyor assembly and feeding station 60, and a frame and a mounting or carriage means slidable on the frame are provided interconnecting the extensions whereby their infeed ends are moved up and down in unison.

Specifically, on either side of the path of veneer traveling to the receiving conveyor assembly, and between the conveyor assembly and the feed station, there are a pair of upstanding opposed frame members 61 (member 61 nearest the viewer in FIG. 1 has been removed to illustrate details otherwise obscured). These may take the form of T-beams, interbraced as by braces 63. Slidable on opposed flanges of each frame member 61 is a carriage part 65. As can best be seen in FIG. 4, each carriage part has an inwardly turned flange 66 along each of its sides, the opposed flanges of each part slidably retaining the part on member 61.

Each part 65 has integral therewith and projecting outwardly from the inwardly disposed face thereof five sets of rail portions 67, 68. The rail portions of each set having cooperating, inwardly turned lips 69 which, together with the remainder of the rail portions and the portion of the face of part 65 bounded by rails 67, 68, define a guide channel for the support of one side of the end of an apron or extension. The extensions are supported in these guide channels by rolls 70 rotatably carried on either side of each extension. In operation, parts 65 are moved up and down in a linear path, the nonpivoted ends of the extensions swinging about an arc as they undergo vertical movement. The sets of rail portions described, which constitute spaced supporting means for the extensions, accommodate shifting of an extension relative to the carriage parts, thereby to take care of the different type of movement which the two undergo.

Connected to each carriage part and reeved over a sprocket 75 mounted on the top of each frame member 61 is a chain 76 carrying at its other end a counterweight 77. A shaft 78 connecting sprockets 75 on either side of the apparatus, and electric motor 79 drivingly connected to shaft 78, are included as a power hoist mechanism for moving the two carriage parts 65 up and down in unison.

Referring now to FIGS. 1 and 3, feed station 60 comprises a frame 81 rotatably supporting an elongated, smooth surfaced, steel bottom roll 82. Bottom roll 82 rotates about a fixed axis in suitable bearings mounted in frame 81, with the top of the roll, which constitutes the feed point for the station, at an elevation approximately centrally between the elevation of the lower and uppermost conveyor sections of assembly 10. Sprocket 84 secured to a shaft extension of the bottom roll, chain 86 and motor 87 drive bottom roll 82. During operation, the bottom roll is rotated continuously and at a speed substantially faster than the speed of the conveyor sections and extensions. This is necessary, since the bottom roll should be run at a speed sufficient to transport enough veneer fully to load all the conveyor extensions with as little space as possible between the tail and lead ends of successive pieces.

Disposed above the bottom roll and mounted for vertical movement toward and away from roll 82 is an elongated roll mechanism indicated generally at 90. Roll mechanism 90 and roll 82 constitute opposed clamping roll mechanisms or power-driven feed means operable to grab opposite faces of veneer sheets when transporting the sheets through the feed station. Roll mechanism 90 comprises a shaft 91 secured at opposite ends to shoes 92, the latter slidably supporting the roll mechanism for vertical movement between flanges 93 of upstanding frame members 91. Spaced along shaft 91 and rotatable thereon are a plurality of wheels 96. Preferably these wheels are equipped with rubber rim surfaces to increase their frictional grab. They are shown all rotatable about a common shaft. Alternatively, they may be rotatably mounted on individually suspended stub shafts, and spring bias means included for each stub shaft to enable each wheel to give when the upper roll mechanism is moved into clamping engagement with lower roll 82. This enables the wheels along roll mechanism 90 to adapt themselves to different thicknesses of veneer. Veneer sheets are fed to the feed station side-by-side in a single layer extending between the lateral sides of the mechanism. Since veneer sheets vary in thickness the alternative construction better assures that the veneer is always grabbed firmly by the opposed roll mechanisms.

Power means are provided for moving the upper roll mechanism toward and away from the lower, smooth surfaced bottom roll. In the embodiment illustrated, this takes the form of a pair of double acting piston-cylinders 101. Each has its rod end secured to a shoe mounting shaft 93, with the cylinder end thereof fixed to frame 81. On expansion of the piston-cylinders, the roll mechanism is lowered, whereas contraction of the piston-cylinders operates to raise the roll mechanism away from bottom roll 82.

A fence bar 105 is swingably mounted in front of roll mechanism 90 and carried on arms 103 rotatable on roll shaft 91. Fence bar 105 is pivoted up and down by double acting piston-cylinders 106 connected at one set of ends to a transverse beam 107 of frame 81, and at their other set of ends to arms 103. Expansion of piston-cylinders 106 causes the fence bar to swing downwardly to block forward progress of veneer, whereas contraction of the piston-cylinder moves the fence bar upwardly and out of the way.

Deflectors 111, 112 on the infeed side of roll 82 and roll mechanism 90, and secured in an appropriate manner to frame 81, are included for the purposes of funneling between roll 82 and roll mechanism 90 the lead ends of veneer sheets fed to the feed station from a stack supported to the rear of the station. Portions of the deflectors have been broken away in FIG. 3.

Referring now to FIGS. 5, 6, 7, and 8, rearwardly or on the infeed side of the feed station there is an elevatable platform or support means 121. Support means 121 comprises a pair of elevator sections 122, 123. Section 122 is mounted in a fixed position on the floor whereas section 123 is provided with wheels 124 and thus can have its position shifted relative to section 122. Wheels 124 are flanged, and are guided in their movement by rails 126 extending along the ground beneath the elevator section. Suitable brake mechanism (not shown) is provided to lock the wheels in place. By including a shiftable or movable elevator section, veneer sheets of varied lengths are easily handled.

Each of the elevator sections has an elevatable frame, indicated at 127 and 128 which mounts a series of rotatable rolls 129 arranged in parallel rows, each section having two rows of rolls. The rolls support veneer on the elevator sections and provide a rolling surface for moving veneer stacks onto the sections.

Elevatable frames 127, 128 are raised and lowered by mechanisms which are similar, only one of which is described. Considering section 123, on either side of frame 128 there is a scissor lift structure having crossed strut members 131, 132 pivotally connected intermediate their ends at 133. One set of ends of struts 131, 132 are pivotally connected as at 134, 136, to elevatable frame 129 and a base frame 137 for the section. The other set of ends of the struts are slidably mounted in slots 138, 139 formed in frames 128, 137. Movement of the strut ends away from each other, from the position shown in FIG. 6 to the position shown in FIG. 7, operates to raise frame 128.

Piston-cylinders 141 are mounted in frame 137 with their cylinder ends secured to the frame and their rod ends connected to the sliding ends of struts 132, as by rod 142. These piston-cylinders constitute motor means for raising and lowering the elevatable frame of the elevator section. Contraction of the piston-cylinders raises frame 128, and expansion of the devices lower frame 128.

The operation of the veneer feeding apparatus so far described is as follows: The conveyor sections of assembly 10 and the conveyor extensions are driven by motor 46 at a constant, relatively slow speed. Assuming a particular extension has just been loaded with veneer, motor 79 is actuated to cause lifting of carriage parts 65. When the extension next to and below the one just loaded moves into registry with the feed point of feed station 60, motor 79 is stopped. During this time, fence bar 105 is kept lowered and roll mechanism 90 raised, to enable an operator to place veneer sheets side-by-side over roll 82 with the lead ends of the sheets abutting fence bar 105.

When the extension or apron newly moved into registry with the feed point of station 60 has cleared itself enough to permit the charging thereon of a new load of veneer, fence 105 is raised and roll mechanism 90 lowered against roll 82. This causes the veneer sheets just placed against fence 105 to travel through the feed station and onto the conveyor extension. When the veneer is fully loaded on the extension, the process is repeated. When the lowermost extension is loaded, carriage parts 65 drop and the uppermost extension is the next one to be loaded.

Figure 9:
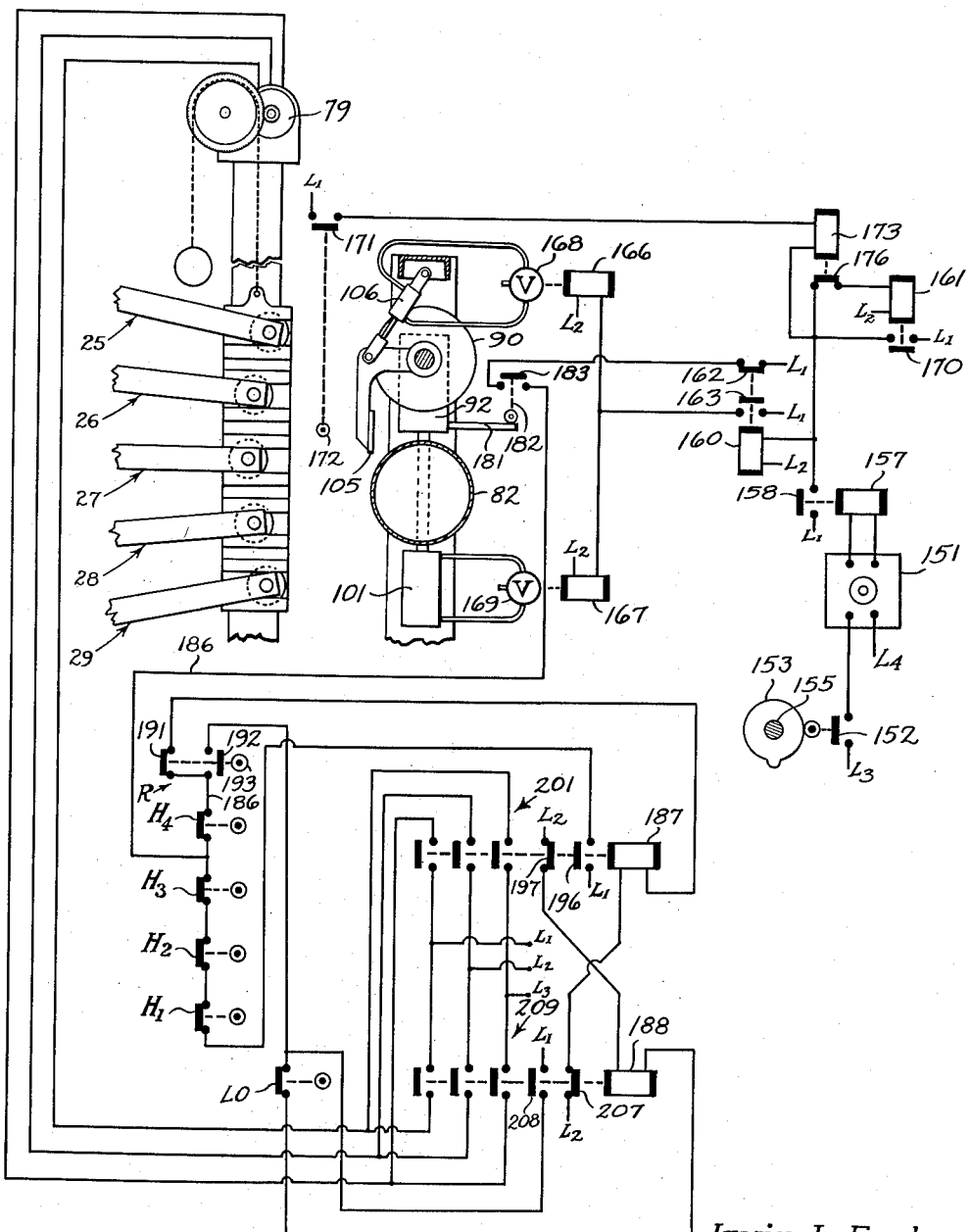
FIG. 9 is a diagrammatic showing of a control mechanism such as can be used for coordinating movement of the various parts present.

A control system such as may be used in the invention is illustrated in FIG. 9. Many of the components illustrated in FIG. 9 have been excluded from the other figures for reasons of clarity.

Referring to FIG. 9, 151 indicates a conventional electronic counter, operable to count up to a preset number of electric impulses delivered thereto, and provide an electric output pulse on reaching the preset number, after which it resets and repeats the cycle. Electronic counters of this type are widely marketed, and are available from such manufacturers as Berkeley Scientific, a Division of Beckman Instruments Inc., Richmond, California; and Brush Electronics Company, an operating unit of Clevite Corporation, Cleveland, Ohio.

Electric impulses are delivered to counter 151 by a switch 152 closed at intervals by a cam or control part 153, and operable when closed to connect the input terminals of counter 151 to direct current supply conductors L3, L4. Cam 153 is rotated by shaft 155, which is driven (see FIG. 1) by chain 156 connected to motor 46. Thus the impulses given counter 151 are given at a frequency related to the speed of motor 46 and the conveyor sections of assembly 10. It follows also that the output pulses from counter 151 will also occur at a frequency related to the speed of motor 46. The output from counter 151 momentarily energizes a solenoid 157, which functions to initiate an operating cycle in the feed station.

It should be apparent that by proper proportioning of the parts, counter 151 need not be employed, as the output from switch 153 may be used directly for energizing solenoid 157 and thus initiating an operating cycle. However, the latter arrangement is somewhat inflexible and incapable of easy adjustment. The presence of the counter enables the frequency of successive operating cycles of the feed station to be changed readily, which is important when handling veneer of varied lengths.

Referring again to FIG. 9, solenoid 157 when energized closes switch 158 ganged to the solenoid thus operating to energize a pair of solenoids 160, 161 by connecting the latter solenoids across source conductors L1, L2. Energizing of solenoid 160 opens normally closed switch 162 and closes normally open switch 163 ganged to this solenoid. Closing of switch 163 energizes fence solenoid 166 and roll solenoid 167. When these latter solenoids are energized, valves 168, 169 are adjusted to the solenoids are adjusted to cause fence bar 105 to move up and out of the way of the path of veneer, and upper roll mechanism 90 to move down against lower roll 82. This initiates movement of veneer through the feed station.

Solenoid 161 is a holding solenoid serving to maintain solenoid 160 energized after opening of switch 158, by completing a path from conductor L1 through switch 170 to solenoid 160.

A switch 171 is actuated by finger 172 which is in the path of veneer as it moves from the feed station to an extension. Veneer on passing beneath finger 172 closes switch 171 to cause energizing of a solenoid 173. When the latter is energized, normally closed switch 176 ganged to the solenoid opens, solenoid 161 is deenergized and switch 170 opens, so that the path from conductor L1 to solenoid 160 and conductor L2 is through switch 171. Solenoid 160 remains in an energized state until the tail ends of the veneer pass beyond switch 171 and finger 172. When the latter occurs switch 171 opens, solenoid 160 becomes deenergized, switches 162, 163 open, solenoids 166, 167 become deenergized, and fence bar 105 moves down with roll mechanism 90 moving away from roll 82. The various components now occupy their original state, and their operating cycle is complete.

Actuation of the hoist mechanism and motor 79 occurs after the veneer leaves finger 172, and since the frequency at which this occurs depends on the impulses delivered by counter 151, so does actuation of the hoist mechanism. Put in another way, motor 79, as well as the piston-cylinders moving the fence and roll mechanism 90 are all actuated by a control circuit connected to and responsive to the speed of the conveyors of assembly 10.

Considering now the hoist mechanism in particular, connected to one of the shoes 92 moving with roll mechanism 90 is a lever 181. This lever, when roll mechanism 90 is fully retracted, contacts a switch finger 182 to open a switch 183. Before roll mechanism 90 is fully retracted, however, switch 183 is closed. A short time interval elapses after solenoid 160 is deenergized and before roll mechanism 90 is fully retracted, and during this time interval conductor L1 is connected to a conductor 186 through closed switches 162, 183.

In this condition of the parts, referring to the lower portion of FIG. 9, a closed circuit is made either to an "up" solenoid 187, or a "down" solenoid 188, depending on the position of a pair of switches 191, 192 in a reversing switch unit R. These switches are both ganged to a common switch finger 193, and the unit R is secured to frame 61 (see FIG. 1) above a carriage part 65 so that the finger is actuated to reverse the connection shown in FIG. 9 when the part 65 is fully raised and the lowermost extension 29 is in registry with the feed point of station 60. When finger 193 is not actuated, switches 191, 192 are biased to return to the position shown in FIG. 9.

Assuming for the sake of explanation that middle conveyor extension 27 in FIG. 1 has just been loaded, switches 191, 192 will be in the position shown in FIG. 9 and "up" solenoid 187 will be energized when switches 183, 162 are closed. This causes switch 196 to close and switch 197 (locking out solenoid 188) to open, these latter switches being ganged to solenoid 187. Switch 196 acts as a holding switch keeping solenoid 187 energized when switch 183 opens. Energizing of solenoid 187 also causes three motor control switches 201 to close which results in motor 79 being actuated to move carriage parts 65 upwardly.

Motor 79 continues to run until the next extension (extension 28) moves into registry with the feed point of station 60. When this occurs, a cam operated switch H2 carried on one of the carriage parts and movable therewith, crosses a cam 206 secured to frame 81 of the feed station (see FIG. 1), and the switch is momentarily opened. The override of the carriage parts then moves the switch past the cam to close the switch, but in the interim solenoid 187 is deenergized and motor 79 stopped.

Additional switches H1, H3, and H4 are provided for extensions 29, 27, and 26, respectively, which perform functions similar to that performed by switch H2 for extension 28.

A switch L0 is carried by the upper extension 25 (see FIG. 1) and this is in the conductor line between solenoid 188 and switch 192 (see FIG. 9). This switch stops motor 79 when run in a reverse direction. When the lowest extension moves into feeding position and subsequently motor 79 is stopped, switch 191 opens and switch 192 closes as previously explained. When the next operating cycle occurs and both switches 193, 162 are closed momentarily, solenoid 188 becomes energized, switch 207 opens and switch 208 closes, together with closing of three motor switches 209. Motor 79 is actuated to lower carriage parts 65, and movement continues until switch L0 is opened by moving across cam 206, causing deenergizing of solenoid 188.

The construction described has a number of desirable features. The control mechanism is readily adjustable by adjustment of the number of input impulses required by counter 151 before transmitting an output pulse. Thus, when short veneer sheets are being handled, counter 151 is set to give an output pulse after relatively few input pulses, and movement of the extensions to registering positions occurs at more frequent intervals. However, the movement is still correlated with the movement of the conveyors of the receiving conveyor 10.

There is no need for any switches actuated by the introduction of veneer to the feed station. The frequency of the feed from the feed station to the conveyor extension is controlled entirely by the counter and independently of any trip at feed station 60.

The smooth bottom roll of the feed station rotates about a fixed axis, so that the feed point of the feed station is at a constant elevation, and this elevation is intermediate the elevation of the lower and uppermost sections of the conveyor assembly. The result of such a construction is to reduce the maximum incline over which a sheet must travel in moving from the feed station to the conveyor assembly proper. While roll 82 of the feed station rotates at a fixed elevation, the height of the stack of veneer fed to station 60 is adjusted at intervals to compensate for changes occurring in its height. This movement, however, is at relatively infrequent intervals. Deflection plates 111, 112, by functioning as funnel surfaces, are included to reduce the number of adjustments necessary.

While there has been described an embodiment of the invention, it is desired not to be limited to the specific parts and arrangements disclosed. It is intended to cover all modifications and variations which would be apparent to one skilled in the art and that come within the scope of the appended claims.

We claim:

1. In veneer sheet handling apparatus, said apparatus having a multideck receiving conveyor assembly with plural substantially vertically stationary conveyor sections stacked one over another, a feed station spaced rearwardly of said conveyor assembly having a feed point spaced at a fixed elevation which is intermediate the elevation of the lower and uppermost conveyor sections of said conveyor assembly, said feed station having power driven means transporting sheets through the feed station, a carriage and means mounting the carriage for movement in a linear vertical path in front of said feed station, a conveyor extension for each conveyor section connecting with the section and spaced between said feed station and conveyor assembly, each extension being pivoted at the outfeed end of the extension to the infeed end of the conveyor section, said carriage having plural spaced supporting means each supporting an extension and spacing the nonpivoted ends of said extensions one from another, each of said supporting means accommodating shifting of the extension supported thereby relative to the supporting means, and power hoist mechanism connected to said carriage for moving the same.

2. In veneer sheet handling apparatus, said apparatus having a multideck receiving conveyor assembly with plural substantially vertically stationary conveyor sections stacked one over another, power means driving said conveyor sections at a predetermined speed, a feed station spaced rearwardly of said conveyor assembly having a feed point spaced at a fixed elevation which is intermediate the elevation of the lower and uppermost sections of said conveyor assembly, said feed station having opposed roll mechanisms transporting sheets through the station at the elevation of said feed point, a pivoted conveyor extension for each conveyor section connecting at its pivoted end with the infeed end of the section and positioned between said feed station and said conveyor assembly, the nonpivoted ends of said extensions being movable into and out of registry with the feed point of said feed station, a carriage and frame means mounting the carriage for movement in a linear vertical path in front of said feed station, said carriage having plural spaced supports each supporting an extension and spacing the nonpivoted ends of said extensions from each other, each of said supports accommodating shifting of the extension supported thereby as the extension is pivoted by vertical movement of the carriage, motor hoist means for moving said carriage up and down, and control means actuating said motor hoist means at intervals determined by the speed of said driven conveyor sections and deactuating said motor hoist means when an extension moves into registry with the feed point of said feed station.

3. In veneer sheet handling apparatus, said apparatus having a multideck conveyor assembly with plural substantially vertically stationary conveyor sections stacked one over another and driven at a predetermined speed, a feed station spaced rearwardly of said conveyor assembly, said feed station having power driven means transporting sheets therethrough along a path having a fixed elevation, a pivoted conveyor extension for each conveyor section connecting at its pivoted end to the infeed end of the conveyor section, said extensions being positioned between said feed station and conveyor assembly, the nonpivoted ends of said extensions being movable into and out of registry with the path of veneer through said feed station, a carriage and means mounting the carriage for movement vertically in front of the feed station, said carriage having spaced supports each supporting an extension and spacing the nonpivoted ends of the extensions one from another, hoist means including a motor for moving said carriage up and down, and control means for said motor, said control means comprising a pulse generating device generating control pulses at intervals determined by the speed of said conveyor sections, a counter operable to produce an output pulse after counting said pulses of the pulse generating device, means connecting said counter to said motor with said output pulses actuating said motor to initiate movement of said carriage, and additional means actuated by movement of an extension into registry with the path of veneer through said feed station to deactuate said motor.

4. For sheet handling apparatus including plural conveyor sections stacked one over another, a feed station on the infeed side of said sections and having a feed roll rotatable about an axis extending transversely of the sections, a conveyor extension for each conveyor section intermediate said feed station and the sections and pivotally mounted at one end adjacent the conveyor section with the non-pivoted end thereof movable up and down in front of said feed station, hoist mechanism including a motor connected to said extensions for moving them up and down, and control means for said motor operable to actuate and de-actuate the motor, said control means including an impulse generator generating control pulses at intervals determined by the driven speed of said conveyor sections, a counter operable to produce an output pulse after counting said control impulses, and circuit means connecting the counter and hoist motor.

5. In apparatus for feeding sheets from a stack into a multiple deck conveyor, an elongated extension connected to each deck in position to feed the deck, the extensions for said decks having vertically movable infeed ends, a feed station with pinch roll means for feeding sheets in the infeed ends of said extensions, said pinch roll means comprising a smooth-surfaced motor-driven supporting roll extending transversely of the feed ends of said extensions and a rotatable nonpowered clamping roll mechanism mounted above said supporting roll for movement toward and away from said supporting roll, said clamping roll mechanism including plural rubber-surfaced wheels spaced axially therealong with the surface of each wheel yieldable radially independently of the surface of the other wheel, said rubber-surfaced wheels accommodating differences along the length of said clamping roll mechanism in the spacing between the bottom thereof and the top of said supporting roll, and power-driven means for moving successive ones of the infeed ends of said extensions into a sheet-receiving position with respect to said supporting roll, said supporting roll during the time that an extension is being moved into a sheet-receiving position providing means for supporting the end of a sheet laid thereon.

6. In apparatus for feeding sheets from a stack into a multiple deck conveyor, an elongated extension connected to each deck in position to feed the deck, the extensions for said decks having vertically movable infeed ends, a feed station with pinch roll means including opposed roll mechanisms for feeding sheets to the infeed ends of said extensions, means for moving successive ones of the infeed ends of said extensions into sheet-receiving position with respect to said pinch roll means, motor means for moving the roll mechanisms of said pinch roll means toward and away from each other, and control means for controlling the movement of the roll mechanisms in said pinch roll means, said control means comprising sensing means on the off-bearing side of said pinch roll means, and means connecting said sensing means and said motor means whereby movement of the roll mechanisms away from each other occurs only after the trailing end of a sheet moves beyond said sensing means.

7. For sheet handling apparatus including plural driven conveyor sections stacked one over another, a feed station on the infeed side of said conveyor sections having opposed transversely extending roll mechanisms movable between clamping and release positions, first motor means for moving said roll mechanisms, a conveyor extension for each conveyor section intermediate said feed station and the conveyor section with an end thereof adjacent the feed station movable up and down in front of said feed station, second motor means connected to said extensions for moving them up and down, and control means for said first motor means, said control means including an impulse generator generating control pulses at intervals determined by the driven speed of the conveyor sections, a counter operable to produce an output pulse after counting said control pulses, means connecting said counter and said first motor means whereby the roll mechanisms are moved to their clamping position on the first motor means receiving an output pulse from said counter, sensing means on the off-bearing side of the opposed roll mechanisms, and means connecting said sensing means and first motor means whereby the opposed roll mechanisms are moved to their release position on a trailing end of a sheet passing beyond said sensing means.

8. In sheet handling apparatus, a conveyor assembly having plural decks stacked one over another, a feed station on the infeed side of said conveyor assembly, power-driven means in said feed station for transporting sheets therethrough, a carriage, means mounting the carriage for movement in a path up and down on the off-bearing side of said feed station, a pivoted conveyor extension for each deck of the conveyor assembly connecting with the deck and extending between the feed station and the conveyor assembly, said extensions having non-pivoted ends adjacent said feed station, plural spaced supporting means in said carriage, each of said supporting means supporting an extension, said supporting means spacing the various extensions vertically, each of said supporting means accommodating longitudinal shifting of the extension relative to said carriage on pivotal movement of the extension, and hoist mechanism connected to the carriage for moving the same up and down.

9. In apparatus for feeding sheets from a stack into a multideck conveyor, an elonated extension connected to each deck in position to feed the deck, the extensions for said decks having vertically movable infeed ends, a feed station with pinch roll means for feeding sheets to the infeed ends of said extensions, said pinch roll means comprising a smooth-surfaced motor-driven supporting roll extending transversely of the infeed ends of said extensions and a rotatable non-powered clamping roll mechanism mounted above said supporting roll for movement toward and away from the supporting roll, said clamping roll mechanism having a construction accommodating along its length differences in the spacing between the bottom thereof and the top of said supporting roll, motor means for moving said clamping roll mechanism toward and away from said supporting roll, control means for said motor means, said control means including a sensing means on the off-bearing side of said pinch roll operable to sense the position of the trailing end of a sheet when such moves beyond said pinch roll means, and power-driven means for moving successive ones of the infeed ends of said extensions into a sheet-receiving position with respect to said supporting roll.

References Cited in the file of this patent

UNITED STATES PATENTS

| | | |
|---|---|---|
| 2,536,756 | Lopez | Jan. 2, 1951 |
| 2,649,182 | Parker | Aug. 18, 1953 |
| 2,804,192 | Armstrong et al. | Aug. 27, 1957 |
| 3,011,619 | Fields | Dec. 5, 1961 |